US012187020B2

(12) United States Patent
Poli et al.

(10) Patent No.: US 12,187,020 B2
(45) Date of Patent: Jan. 7, 2025

(54) METHOD FOR THE FORMING AND FINISHING OF AN ACCESSORY CLADDING ELEMENT FOR USE IN ARCHITECTURE AND DESIGN

(71) Applicant: POLITECNICO DI MILANO, Milan (IT)

(72) Inventors: Tiziana Poli, Milan (IT); Alberto Speroni, Milan (IT); Andrea Giovanni Mainini, Milan (IT)

(73) Assignee: POLITECNICO DI MILANO, Milan (IT)

( * ) Notice: Subject to any disclaimer, the term of this patent is extended or adjusted under 35 U.S.C. 154(b) by 440 days.

(21) Appl. No.: 17/621,292

(22) PCT Filed: Jun. 26, 2020

(86) PCT No.: PCT/IB2020/056068
§ 371 (c)(1),
(2) Date: Dec. 21, 2021

(87) PCT Pub. No.: WO2020/261206
PCT Pub. Date: Dec. 30, 2020

(65) Prior Publication Data
US 2022/0355588 A1 Nov. 10, 2022

(30) Foreign Application Priority Data
Jun. 28, 2019 (IT) .................. 102019000010485

(51) Int. Cl.
*B32B 37/24* (2006.01)
*B28B 19/00* (2006.01)
(Continued)

(52) U.S. Cl.
CPC .......... *B32B 37/24* (2013.01); *B28B 19/0015* (2013.01); *B32B 3/28* (2013.01);
(Continued)

(58) Field of Classification Search
CPC .................. B28B 19/0076; B28B 19/0015
See application file for complete search history.

(56) References Cited

U.S. PATENT DOCUMENTS

2007/0293112 A1    12/2007   Hanson et al.
2009/0255211 A1*   10/2009   Collison ............... B28B 7/0038
                                                        52/745.19

FOREIGN PATENT DOCUMENTS

WO      2018195088 A1    10/2018

OTHER PUBLICATIONS

International Search Report and Written Opinion issued on Sep. 18, 2020 in corresponding International Application No. PCT/IB2020/056068; 7 pages.

* cited by examiner

*Primary Examiner* — Christopher T Schatz
(74) *Attorney, Agent, or Firm* — Maier & Maier, PLLC

(57) ABSTRACT

A method for making an accessory cladding element for use in architecture and design. The method provides preparing an elastically deformable support element, including a first outer surface, in particular a decorated surface, a second outer surface and a plurality of spacer elements placed between the two surfaces. An impermeable and removable layer is applied on the first outer surface to protect at least a part thereof. Then a fluid cement mixture is prepared and introduced into the support element to obtain a cement-based composite structure in a deformable state. The excess fluid cement mixture is removed from the support element. The cement-based composite structure in the deformable state is positioned in a forming device which gives it the desired shape. The composite structure is solidified and after the removable layer is removed.

19 Claims, 10 Drawing Sheets

(51) Int. Cl.
*B32B 3/28* (2006.01)
*B32B 5/02* (2006.01)
*B32B 13/12* (2006.01)
*B32B 13/14* (2006.01)
*B32B 27/32* (2006.01)
*B32B 37/26* (2006.01)
*B32B 38/00* (2006.01)
*B32B 38/10* (2006.01)
*B44C 5/04* (2006.01)
*E04F 13/14* (2006.01)

(52) U.S. Cl.
CPC ............... *B32B 5/02* (2013.01); *B32B 13/12* (2013.01); *B32B 13/14* (2013.01); *B32B 27/32* (2013.01); *B32B 37/26* (2013.01); *B32B 38/0004* (2013.01); *B32B 38/10* (2013.01); *B44C 5/0461* (2013.01); *E04F 13/141* (2013.01); *B32B 2037/268* (2013.01); *B32B 2262/0261* (2013.01); *B32B 2262/0284* (2013.01); *B32B 2305/18* (2013.01); *B32B 2307/51* (2013.01); *B32B 2315/06* (2013.01); *B32B 2323/04* (2013.01); *B32B 2367/00* (2013.01); *B32B 2377/00* (2013.01); *B32B 2451/00* (2013.01); *B32B 2607/00* (2013.01)

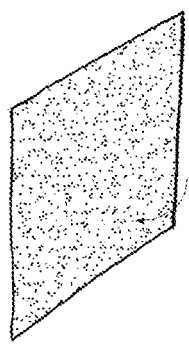 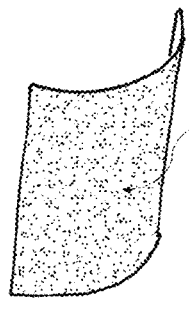 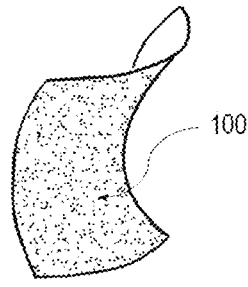
Fig. 1a　　　　　Fig. 1b　　　　　Fig. 1c
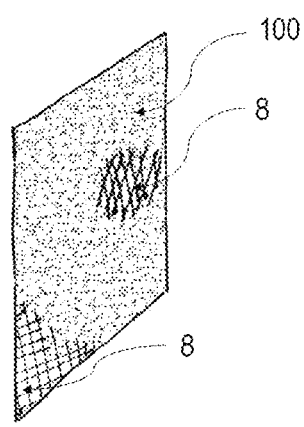 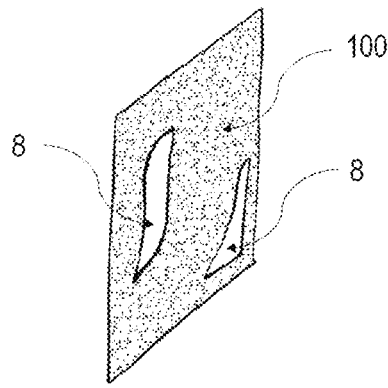
Fig. 2a　　　　　Fig. 2b

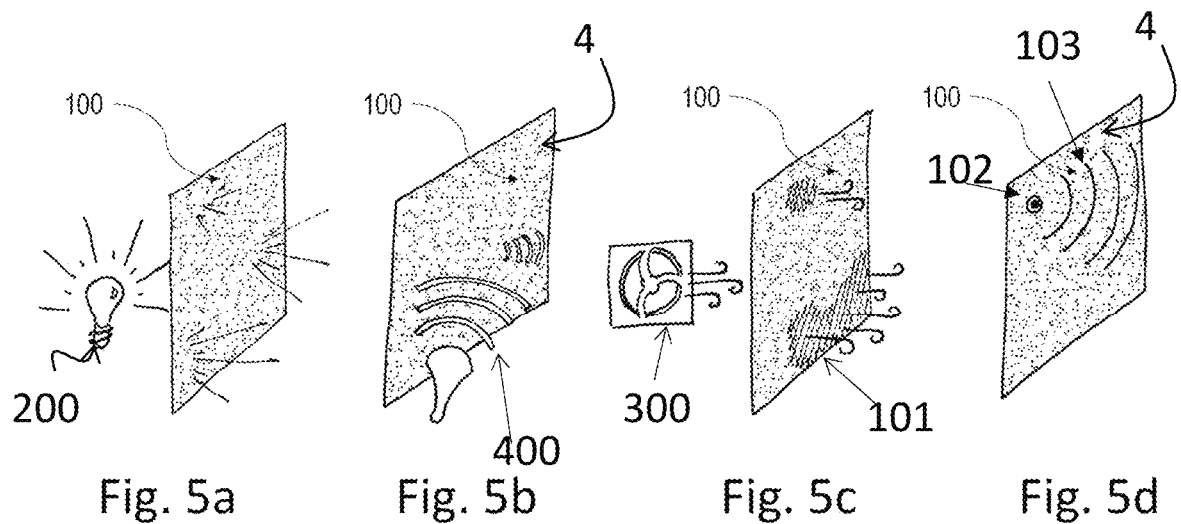
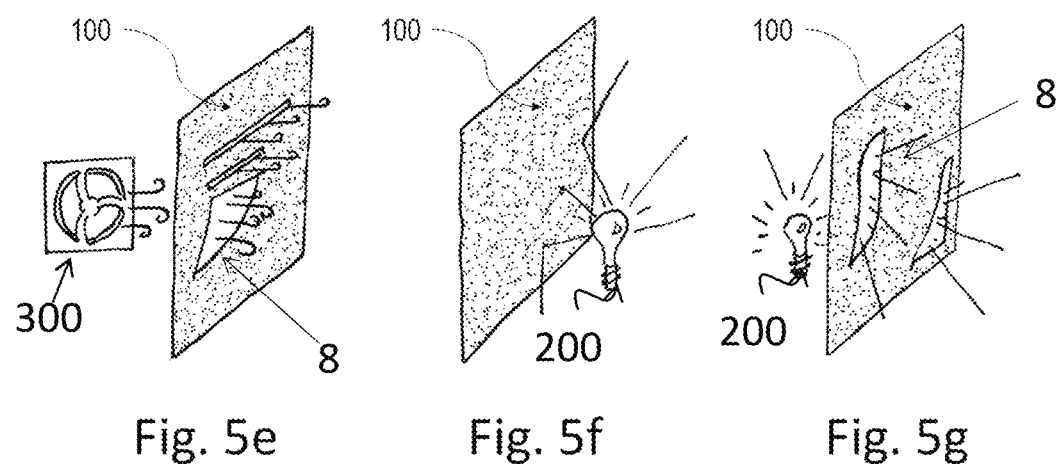

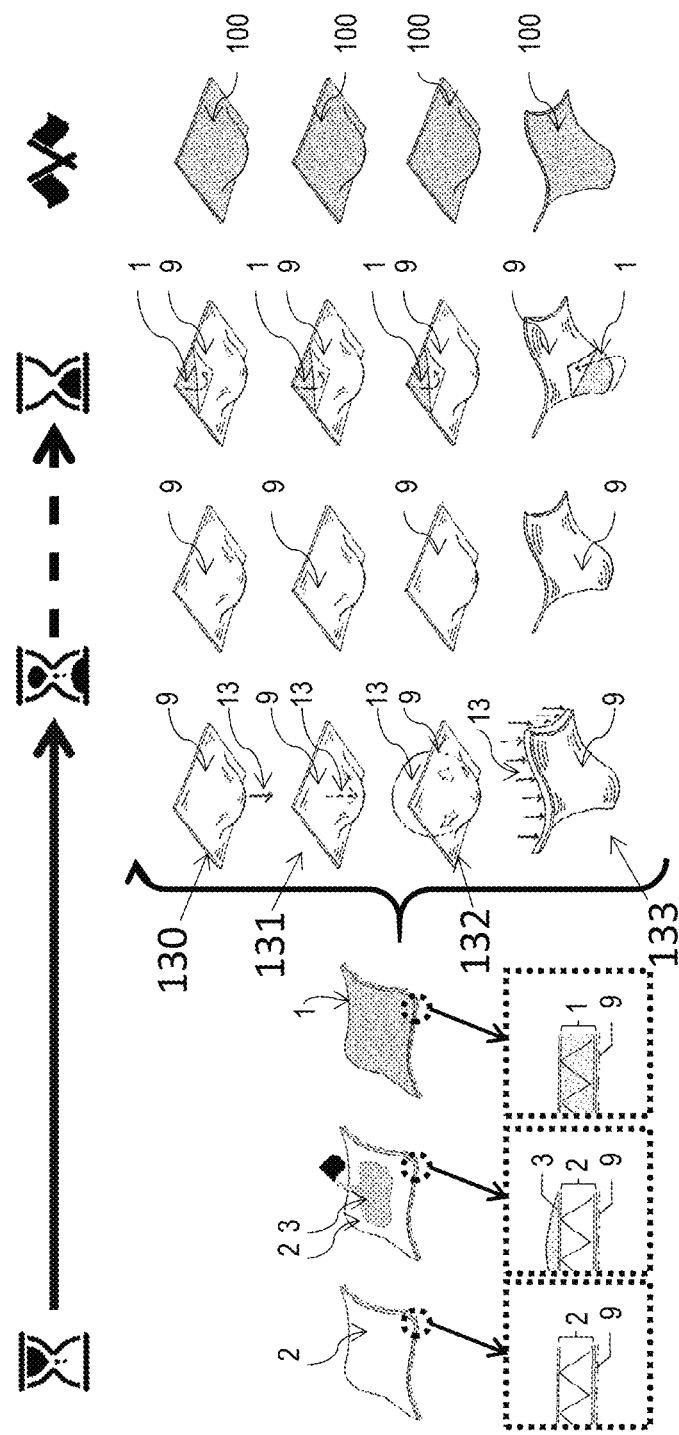

METHOD FOR THE FORMING AND FINISHING OF AN ACCESSORY CLADDING ELEMENT FOR USE IN ARCHITECTURE AND DESIGN

TECHNICAL FIELD

The present invention relates to the field of accessory structures for use in architecture and design. Particularly, the invention relates to a method for making an accessory cladding element.

BACKGROUND

To date in the field of architecture, generally custom-made accessory cladding accessories are made also with a decorative function, using various generally customized techniques, based on the specific need to be resolved.

Possible examples may be fabric or paper claddings, such as for example wallpaper adapted to obtain a decorative and cladding element for walls, or more generally panels or partitions that may be covered by painting, stuccoing and/or colouring, or again by applying decorative elements that are pre-made and successively applied. Such decorative elements are made both on site, by assembling pre-made components, and in a step preceding the application thereof; in any case, the particularity of such accessory cladding elements is the lack of repeatability in making them because although somewhat standardized raw materials are used (wallpaper, panel), there is provided, in the step of making the finished cladding element, i.e. in the application thereof in the final intended place, a processing step for completing the same that differs each time.

The panels usually used for creating accessory cladding elements also are available according to a generally sheet-shaped conformation and are to be suitably cut out/shaped and then associated to obtain the desired shape. Therefore, claddings having complex shapes such as, for example characterized by geometries with a single or double curve or with multiple dips or folds, holes, cavities, etc., are not usually made in an easy and affordable manner.

Furthermore, in certain applications it becomes required to make cladding elements that have one or more housings intended to receive complementary elements, such as, for example devices serving a technical (i.e. which allow acoustically insulating or modifying the absorption and/or the sound reflection, lighting or heating/cooling the ambient in which they are installed) or decorative function. Whatever the solution employed, it is in any case necessary to protect the integrity of the structure of the cladding element in which said housings are obtained, based on the specific context.

The accessory cladding elements are therefore to be provided with features of versatility and to be easily mouldable according to the specific needs of use, in addition to keeping integral the features of the surface/face which is visible during the use/employment thereof. This requires an increased attention during the production step, which makes the cladding elements on the market very costly, or in any case not immediately feasible.

Document WO 2018/195088 makes known a cementitious composite mat to be hydrated on site. The mat comprises a first layer, a second layer, a cement mixture and an adhesive layer. The cement mixture is arranged in the first layer and comprises a plurality of cement particles. The second layer is arranged along the cement mixture, in front of the first layer. The adhesive layer is positioned so as to bind at least one of the two layers (i) the first layer to the cement mixture, (ii) the second layer to the cement mixture, and (iii) the first layer and the second layer together. The first layer and the second layer are configured so as to at least partially avoid the cement particles from coming out of the cementitious composite mat.

Although this solution describes a mat capable of being deformed to adapt to the surface to be covered, it does not deal with the problem of making accessory cladding elements, therefore it does not lend itself to making elements of this type, as it does not provide any contrivance for making a cladding element that comprises a surface with decorative elements.

SUMMARY

The object of the present invention is to overcome the drawbacks of the prior art.

In particular, the object of the present invention is to provide a method for making accessory cladding elements, in particular for employment in architecture or interior design, which involve using surfaces also having a complex shape, characterized by different degrees of permeability, transparency and/or translucency, finishing, roughness, and/or discontinuous surface, in a simple and affordable manner.

It is another object of the present invention to provide a method for making cladding elements that have a visible surface provided with decorative or accessory elements and that allows substantially keeping unaltered the physical-structural features of such visible surface during the steps of making the cladding element itself.

It is a further object of the present invention to provide a method for making accessory cladding elements that allows obtaining elements provided with properties of variable translucency and/or transparency, up to obtaining a partially or totally opaque element.

Furthermore, it is an object of the present invention to provide a method for making accessory cladding elements that allows an easy design thereof, and also efficient and quick manufacturing thereof.

Finally, it is the object of the present invention to make an accessory element that is easily configured based on the final aspect to be obtained, for an increased versatility of use.

These and other objects of the present invention are achieved by means of a method incorporating the features of the appended claims, which form an integral part of the present description.

The present invention relates to a method for manufacturing an accessory cladding element for use in architecture and design, which comprises providing at least one elastically deformable support element, comprising a first outer surface, a second outer surface and a plurality of spacer elements placed between said first and second outer surface. The method provides applying at least one impermeable and removable layer on said a portion of the first outer surface, preparing a substantially fluid, water-based cement mixture and introducing said substantially fluid cement mixture into the support element to which the impermeable and removable layer was applied to obtain a cement-based composite structure in a deformable state. The method further provides removing part of the substantially fluid cement mixture from the support element so as to eliminate the excess cement mixture, positioning said cement-based composite structure in the deformable state in a forming device and keeping said cement-based composite structure in association with the forming device up to the solidification thereof. The method then provides removing the removable layer from said at least one portion of the first outer surface once the cement-based composite structure has solidified.

Such solution allows making self-supporting accessory cladding elements that can be configured also according to complex geometries for a wide range of possible applications in the field of architecture, in particular of interiors.

The method according to the invention further allows obtaining a significant reduction of the weight of the cement-based composite structures obtained because both the quantity and the distribution of the cement mixture in the support element are optimized; in this manner, accessory cladding elements provided with properties of variable lightness and transparency and/or translucency may be made to obtain a partially or totally opaque element.

Furthermore, preparing the fluid cement mixture in a step preceding introducing the same into the support element results in the advantage of making an accurate mixture, and therefore arranging a cement mixture that is easy to apply to the support element employed. Unlike the solutions of the prior art in which a mat with cement powder is arranged, which is then hydrated on site, this solution allows having increased control over the features of the mixture and the distribution thereof in the support element.

Making the accessory cladding elements is also advantageously feasible in contained times and with limited costs, also close to the place of application thereof.

According to a different aspect, the invention relates to an accessory cladding element comprising at least one elastically deformable support element, comprising a first outer surface, a second outer surface and a plurality of spacer elements placed between said first and second outer surface and connected thereto. The first outer surface preferably has at least one portion having a heterogeneous structure with respect to the second outer surface, and the spacer elements are arranged so as to form a plurality of cavities in which there is placed a water-based cement mixture according to the method according to the invention.

This solution allows arranging a lightweight and translucent accessory cladding element provided with improved versatility of use, i.e. easy to configure.

The term "removable" means a feature precisely of an object or of a material which, when removed from a support on which it was previously applied, leaves the support itself substantially unaltered.

The present invention may have, in at least one of the aforesaid aspects, at least one of the following preferred features, taken individually or combined with any one of the other preferred features described.

Advantageously, the first outer surface comprises a decorative element on which the impermeable and removable layer is applied. In this manner, when the fluid cement mixture is poured into the support element, it does not damage the decorative element, which is thus preserved. Operatively, the fluid cement mixture is introduced into the support element through one or more openings of the support element where the decorative element is not present, up to filling the support element. If even part of the cement mixture were to leak out of the support element, the decorative element is protected by the impermeable and removable layer. Thus, once the cement structure has solidified, the removable element may be removed to allow the decorative element to be appreciated.

In one embodiment, the method provides removing the solidified cement-based composite structure from the forming device after the solidification of the composite structure. In this manner, the forming device may be reused.

Preferably, the first outer surface has at least one portion having a heterogeneous structure with respect to the second outer surface.

Preferably, keeping the cement-based composite structure in association with the forming device comprises moving the forming device so as to obtain a predetermined configuration of the composite structure itself.

In this manner, it is possible to make accessory cladding elements according to various geometries, from the simplest shapes providing planar surfaces, to the more detailed ones having a single or double curve, up to the possibility of making complex surfaces.

Preferably, the removable element consists of a deformable film made of plastic material or a polymeric coating.

In this manner, a protective barrier advantageously is made with respect to the fluid cement mixture introduced into the support element when the accessory cladding element is being made, thus allowing the integrity and the finishing to be preserved, i.e. the texture, colouring and tactile sensation of the outer surface which, once removed from the impermeable and removable protective layer, remains visible. The feature of deformability of such removable layer also allows an employment thereof also when it is necessary to deform the support element—by means of a forming device—to cause it to take on a desired shape. A plastic film indeed is capable of being deformed with the composite structure when suitable tensile and/or torsion forces are applied to the composite structure positioned on the forming device, for example during a process adapted obtain accessory cladding elements having non-planar geometries.

In a preferred embodiment, the first outer surface and the second outer surface of the support element are connected to each other by means of at least two superimposed connecting layers consisting of respective support elements.

Preferably, each of such connecting layers comprises a plurality of spacer elements.

According to such method, it is possible to make accessory cladding elements having variable thickness according to the specific application needs, in addition to combining different connecting layers, and therefore advantageously fabrics having chemical/physical features of different type, and/or arranging a cladding element with increased thickness.

In a preferred embodiment, the method comprises making at least one opening in the support element by means of cutting and/or drilling.

In this manner, accessory cladding elements may be made comprising housings intended to receive or cover complementary elements, such as for example devices serving a technical function (i.e. which allow lighting or heating/cooling the ambient in which they are installed) or a decorative function, such as for example suspended ceilings or furnishing and interior design elements.

Furthermore, advantageously there may be obtained accessory cladding elements permeable to sunrays and/or to air and/or to water, and also adaptable to various uses such as for example, light diffusion systems and/or acoustic control systems, climate-controlling element screening, solar screening, shading, or again in the employment in covering systems of facades, partitions, suspended ceilings, architectural and interior design elements.

Preferably, the cement mixture comprises a fluidifying and/or plasticizing additive. Preferably, cement, water and fluidifying and/or plasticizing additive are present according to a ratio by weight that may vary from 1; $\frac{1}{3}$; $\frac{1}{3}$ up to 1; $\frac{1}{6}$; $\frac{1}{6}$.

Such solution allows obtaining a lightweight accessory cladding element and curbing the costs of the materials employed in the manufacturing thereof.

In a preferred embodiment, the support element consists of a deformable, three-dimensional fabric. Preferably, said deformable, three-dimensional fabric has elongated spacer elements arranged between said first and second outer surface so as to obtain a plurality of interconnected cavities.

In this manner, when the cement mixture in the fluid state is introduced into the support element, the diffusion thereof is promoted in the composite structure, thus allowing a homogeneous distribution of the same in the cavities to be obtained.

Preferably, said keeping the composite structure in association with the forming device is performed for a predetermined time interval $\Delta t$.

In one embodiment, at least one of said first outer surface and second outer surface is permeable.

This advantageously allows an easy passage from the cement mixture towards the inside of the support element during the introduction step thereof, in addition to the selection of the introduction methods according to the specific features of the materials employed and the environmental conditions.

Preferably, said first outer surface is placed at a variable distance between 1 mm and 30 mm with respect to said second outer surface. Preferably, the first outer surface is placed at a variable distance between 1 mm and 20 mm with respect to the second outer surface. Even more preferably, at a distance between 3 mm and 14 mm.

Further features and objects of the present invention shall be more apparent from the following description.

BRIEF DESCRIPTION OF THE DRAWINGS

The invention is described hereinbelow with reference to some examples provided by way of explanatory and non-limiting example, and illustrated in the accompanying drawings. These drawings illustrate different aspects and embodiments of the present invention and reference numerals illustrating structures, components, materials and/or similar elements in different drawings are indicated by similar reference numerals, where appropriate.

FIG. 1a is a perspective schematic view of an accessory cladding element comprising a composite structure, according to a first embodiment of the present invention;

FIG. 1b is a perspective schematic view of an accessory cladding element comprising a composite structure, in a second embodiment of the present invention;

FIG. 1c is a perspective schematic view of an accessory cladding element comprising a composite structure, in a third embodiment of the present invention.

FIG. 2a schematically shows a perspective view of an accessory cladding element in alternative embodiments of the present invention.

FIG. 2b schematically shows a perspective view of an accessory cladding element in alternative embodiments of the present invention.

FIG. 3b schematically shows a pouring step of a fluid cement mixture onto the support element of FIG. 3a;

FIG. 3c schematically shows the cement mixture that has penetrated the support element of FIG. 3a;

FIG. 3d schematically shows a removal step of an impermeable layer placed to protect an outer surface of the support element of FIG. 3a;

FIG. 4b schematically shows a pouring step of a fluid cement mixture onto the support element of FIG. 4a;

FIG. 4c schematically shows a sectional side view of the cement mixture that has penetrated the upper layer of the multilayer support element of FIG. 4a;

FIG. 4d schematically shows a removal step of an impermeable layer placed to protect an outer surface of the multilayer support element of FIG. 4a;

FIG. 5a schematically shows a perspective view of the interaction between a light source and a semi-transparent accessory cladding element;

FIG. 5b schematically shows a perspective view of the interaction between an acoustic source and a sound-absorbing accessory cladding element;

FIG. 5c schematically shows a perspective view of the interaction between an air emission source of a climate control system and a permeable accessory cladding element;

FIG. 5d schematically shows a perspective view of the interaction between an accessory cladding element according to the present invention and a sensor positioned in the body of the cladding element itself;

FIG. 5e schematically shows a perspective view of the interaction between an air emission source of a climate control system and an accessory cladding element provided with openings;

FIG. 5f schematically shows a perspective view of the interaction between a light source and an accessory cladding element with light-reflecting features;

FIG. 5g schematically shows a perspective view of the interaction between a light source and an accessory cladding element provided with openings.

FIG. 9 schematically shows an alternative method to the one in FIG. 8, for making a multi-curved accessory cladding element.

DETAILED DESCRIPTION OF THE EMBODIMENTS

Figure 3A:
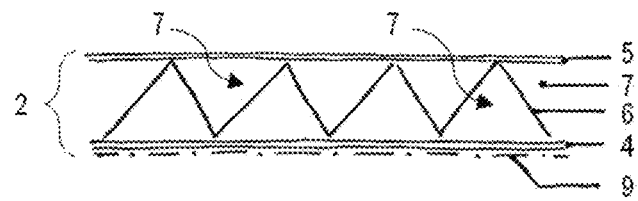
FIG. 3a is a sectional side schematic view of a support element that is part of the composite structure, used for making a cladding element according to a first method of the present invention.

While the invention is susceptible to various modifications and alternative constructions, certain preferred embodiments are shown in the drawings and are described hereinbelow in detail. However, it is to be understood that there is no intention to limit the invention to the specific embodiment illustrated, rather, on the contrary, the invention intends to cover all the modifications, alternative constructions, and equivalents that fall within the scope of the invention as defined in the claims.

The use of "for example", "etc.", "or" indicates non-exclusive alternatives without limitation, unless otherwise indicated. The use of "includes" means "includes, but not limited to" unless otherwise indicated.

With reference to the mentioned drawings, an accessory cladding element made according to various embodiments of the present invention is indicated as a whole with 100. The cladding element 100 comprises a composite structure that includes a support element 2 and a cement mixture 3 placed in such support element 2.

The cladding element 100 may take on different shapes and/or be made by means of alternative procedures.

In FIGS. 1a, 1b and 1c, the accessory cladding element has a composite structure wherein the cement mixture is uniformly distributed in the support element; for this reason, the accessory cladding element 100 is shown with uniform dotting. In FIGS. 1a, 1b and 1c, the accessory cladding element differs in the shape, which in FIG. 1a is planar, while it is differently curved in FIGS. 1b and 1c.

FIGS. 2a and 2b show further embodiments of the accessory cladding element 100. In FIG. 2a, the accessory cladding element 100 has openings 8 that allow the passage of a fluid, e.g. air, through the accessory cladding element 100. In the example of FIG. 2a, the openings are at portions of the support element 2 not filled by the cement mixture 3, while the openings in the example in FIG. 2b are the results of cuts specially provided in the support element 2.

In general, the support element 2, for example shown in FIG. 3a, comprises a first outer surface 4 and a second outer surface 5, which define the volume in which spacer elements 6 are arranged, which are connected both to the first outer surface 4 and to the second outer surface 5, and which are adapted to keep them separate from each other.

Preferably, the first outer surface 4 has a heterogeneous structure with respect to the second outer surface 5 and such as to have features adapted to make a decorative element identifying the accessory cladding element. In other embodiments, both outer surfaces 4 and 5 may have equal or different decorative elements. Such decorative element preferably involves at least one portion of the first outer surface 4 and is such as to be perceivable during the use of the decorative element itself. Possible examples of decorative elements are partial or total colouring or particular structures of such surface adapted to define a desired tactile effect, such as for example the velvet effect. Both the first outer surface 4 and the second outer surface 5 have a structure adapted to allow the deformation thereof so as to allow the modelling thereof, for example to make complex shapes.

The spacer elements 6 preferably have an elongated shape and are arranged so as to form a plurality of cavities 7 in said volume. Such elements 6 may further be arranged orthogonal with respect to the first and second outer surface, or according to an angle of incidence other than 90° based on the properties (e.g. mechanical resistance and/or deformability) that the support element is to have for the specific application. Said spacer elements 6 allow keeping spaced apart the outer surfaces 4 and 5 of the support element 2, also in the face of stresses with slight compression, while ensuring the features of deformability thereof. Preferably, the support element has a resistance to compression greater than about 4 kPa and less than about 69 kPa.

In one embodiment, the first and second surfaces 4, 5 of the support element 2 consist of a weft and a warp so as to allow, by appropriately differentiating the interweaving thereof, different geometries for each of the flat surfaces, and to cause different levels of void-to-solid ratio and advantageously allow the transparency and the mechanical properties of the support element 2 to be varied as desired, based on the specific application needs of the cladding element made therewith. Preferably, said first surface 4 and said second surface 5 are of the textile type.

In a preferred solution, the support element 2 consists of a deformable, elastically extendible three-dimensional fabric, due to the features of the spinning process adapted to make the above-identified structure and/or the use of an elasticized type of thread.

An example of three-dimensional fabric may be obtained with polyethylene terephthalate (PET), polyester (PL) or polyamide (PA) threads.

Preferably, the two outer surfaces are connected by means of an inner connecting layer comprising an alternation of interwoven threads at both the outer surfaces.

Preferably, the spacer elements are made of thread which is woven so as to be interwoven with the first and second surface 4, 5. The thread used to form the surfaces 4, 5, of the support element 2 may be of the same type or may differ based on the particular properties to be given to the first and second surface 4, 5.

The three-dimensional fabric used for making the cladding elements 100 is resistant to tears, abrasions, and has a structure that allows it to extend over the surface and to regain its original shape after being compressed or pulled, i.e. which gives the same properties of elastic deformability. Such type of support element has features of lightness, resistance to compression and permeability to air. In particular, the permeability to air is ensured by making interconnected empty volumes that are made between the spacing elements separating the two outer faces. According to such structure, it therefore is possible to advantageously make a cladding element having a complex and lightweight shape in a simple and affordable manner.

Figure 4A:
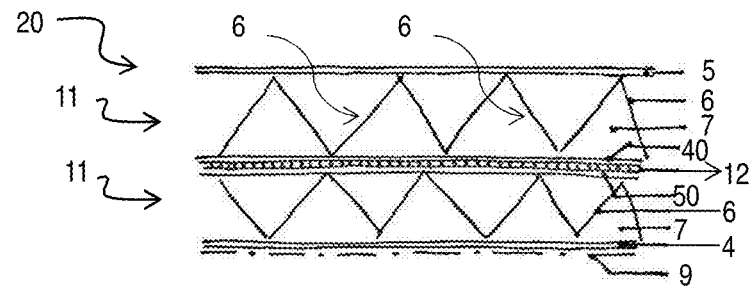
FIG. 4a schematically shows a sectional side view of a multilayer support element that is part of the composite structure, used for making a cladding element according to a third method of the present invention.
Figure 4B:
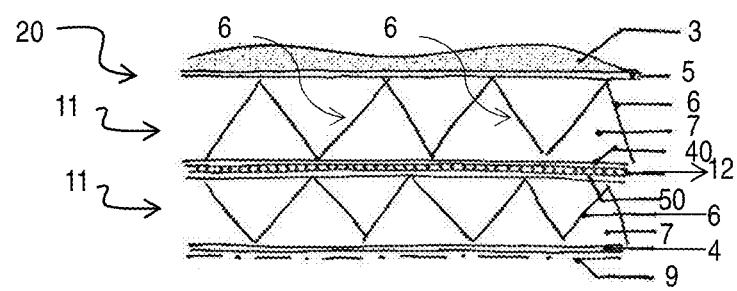
Figure 4C:
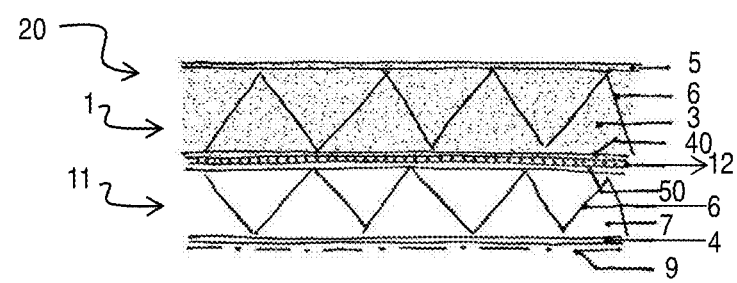
Figure 4D:
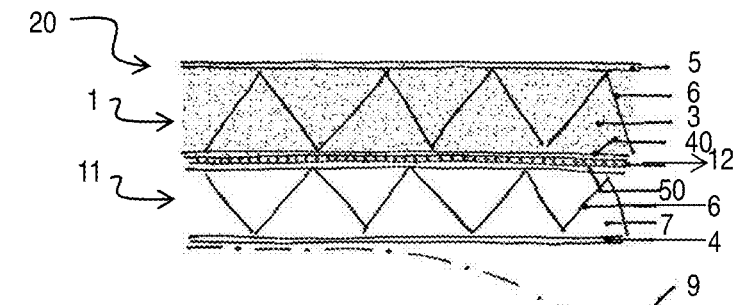
Figure 4E:
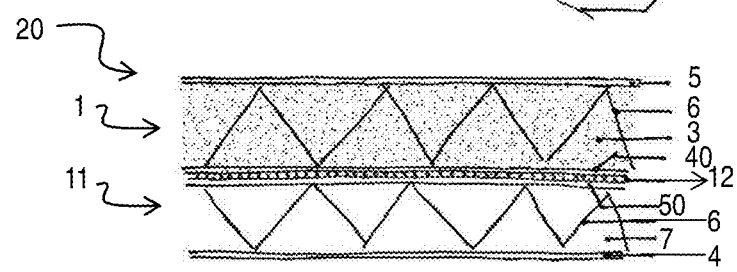
FIG. 4e schematically shows a sectional view of the cladding element obtained after the removal step of the impermeable and removable layer shown in FIG. 4d.
Figure 4G:
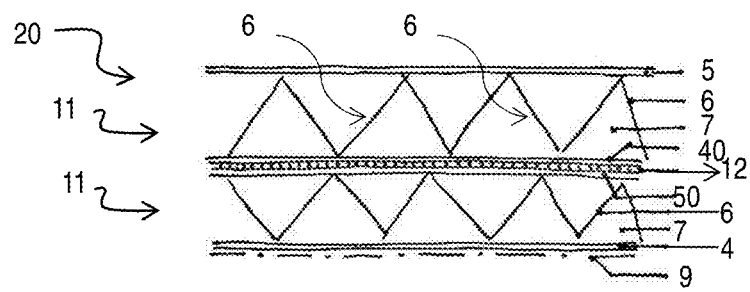
FIG. 4g schematically shows a sectional side view of a multilayer support element that is part of the composite structure, used for making a cladding element according to a fourth method of the present invention.
Figure 4H:
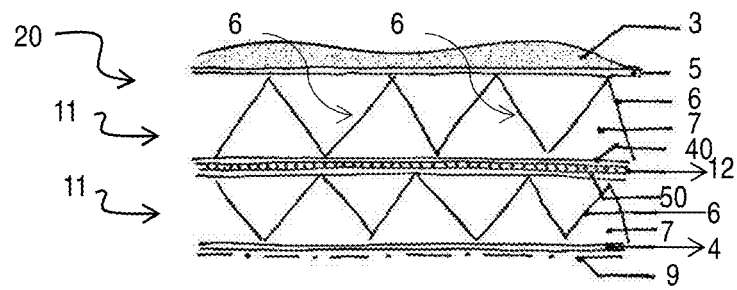
FIG. 4h schematically shows a pouring step of a fluid cement mixture onto the support element of FIG. 4g.
Figure 4I:
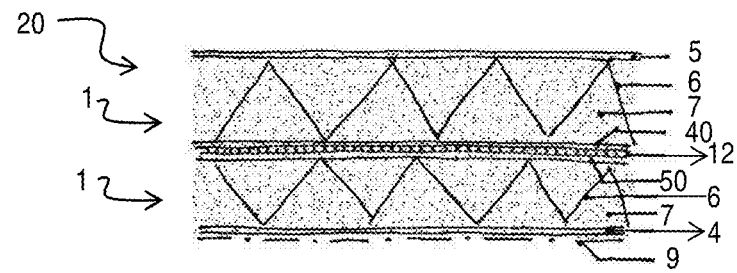
FIG. 4i schematically shows a sectional side view of the cement mixture that has penetrated both layers of the multilayer support element of FIG. 4g.
Figure 4L:
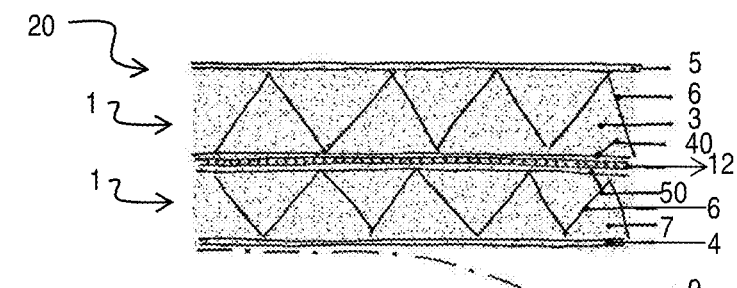
FIG. 4l schematically shows a removal step of an impermeable layer placed to protect an outer surface of the multilayer support element of FIG. 4g.
Figure 4M:
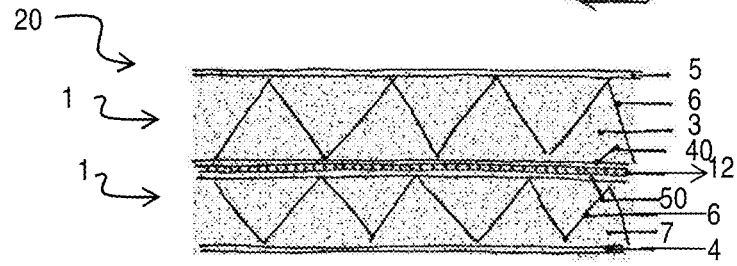
FIG. 4m schematically shows a sectional view of the cladding element obtained after the removal step of the impermeable and removable layer shown in FIG. 4l.
Figure 4N:
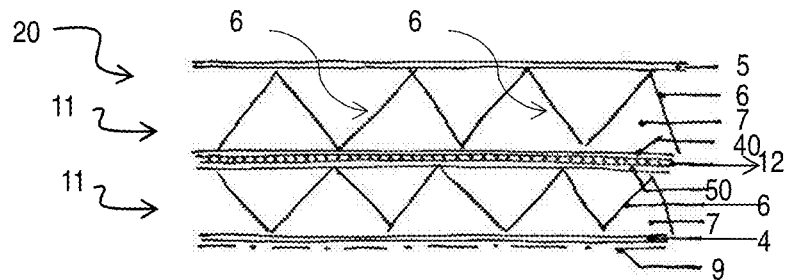
FIG. 4n schematically shows a sectional side view of a multilayer support element that is part of the composite structure, used for making a cladding element according to a fifth method of the present invention.
Figure 4O:
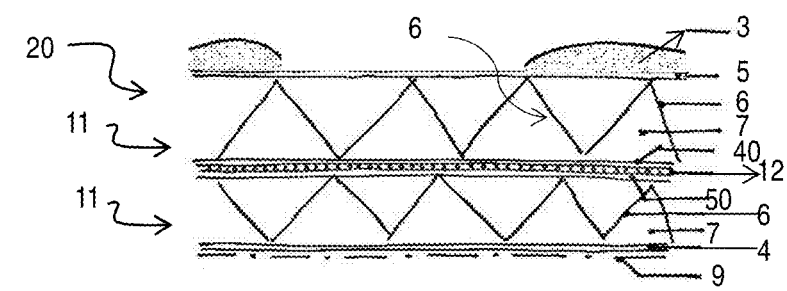
FIG. 4o schematically shows a pouring step of a fluid cement mixture onto certain portions of the support element of FIG. 4n.
Figure 4P:
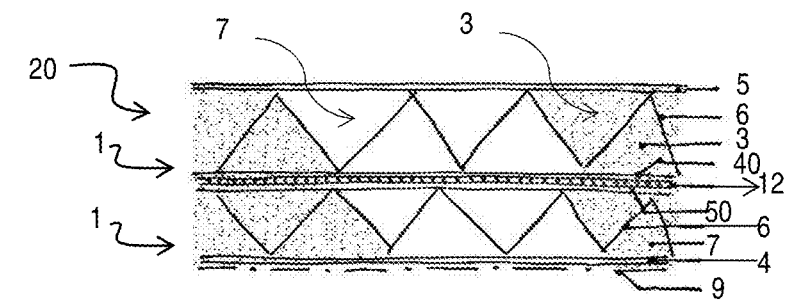
FIG. 4p schematically shows a sectional side view of the cement mixture that has penetrated certain portions of both layers of the multilayer support element of FIG. 4n.
Figure 4Q:
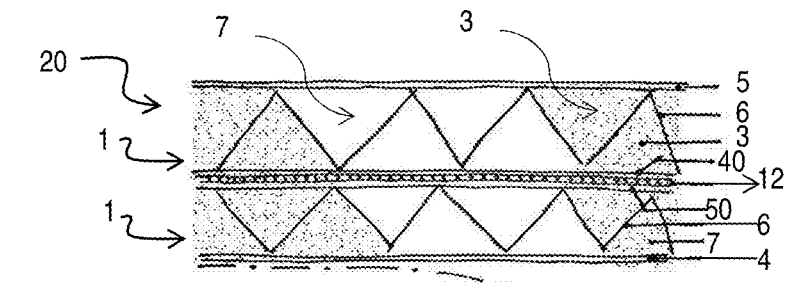
FIG. 4q schematically shows a removal step of an impermeable layer placed to protect an outer surface of the multilayer support element of FIG. 4n.
Figure 4R:
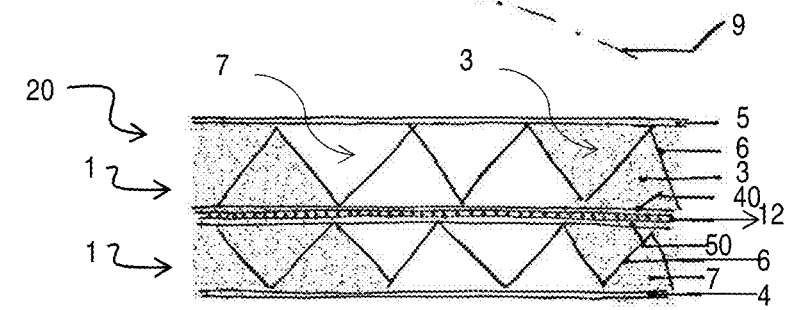
FIG. 4r schematically shows a sectional view of the cladding element obtained after the removal step of the impermeable and removable layer shown in FIG. 4q.

In a further possible embodiment, shown in FIGS. 4*a* to 4*r*, the accessory cladding element to be manufactured is of the multilayer type and comprises a multilayer support element 20. The multilayer support element 20 has a first outer surface 4 and a second outer surface 5, which are connected to each other by means of several connecting layers 11 connected to each other by means of a connection element 12. Each connecting layer 11 substantially replicates the structure of the single-layer support element 2. Each connecting layer 11 indeed comprises a plurality of spacer elements 6 which keep spaced apart the two surfaces (5, 40 and 4, 50 in the drawings), thus forming cavities 7 therebetween. In the event of multilayer support element, the surfaces 40 and 50 that remain in the support element may have different features from the surfaces 4 and 5, both in terms of decorating elements—which are missing here—and in terms of weft and warp. In this manner, a multilayer structure is made between the first and the second outer surface, allowing different fabrics with different chemical/physical features of different type to be combined and/or a cladding element having greater thickness to be arranged.

In a preferred embodiment, the first outer surface 4 and the second outer surface 5 are substantially planar and are kept separate from each other by spacer elements 6 according to a substantially constant distance for the whole extension thereof. In other words, when the (multilayer or not) support element lies on a surface, the two outer surfaces lie on parallel, or substantially parallel, surfaces.

In an alternative embodiment, the spacer elements 6 are configured so as to keep separate the first outer surface 4 from the second outer surface 5 according to a distance that may vary along the extension of the surfaces themselves.

The first outer surface 4 and the second outer surface 5 may also be made according to any combination of weft and warp based on the model and desired finishing, and also on the required requirements of elasticity and the opening factor, or solid-to-void ratio.

According to the method for making cladding elements the object of the present invention, the elastically deformable support element (2, 20) is provided and prepared in a preferably water-based cement mixture 3.

Preferably, the cement mixture 3 comprises a fluidifying and/or plasticizing additive. In a preferred embodiment, the cement mixture 3 comprises cement, additive and water in a ratio by weight that may vary from 1; ⅓; ⅓ up to 1; ⅙; ⅙, according to the porosity of the material that forms the support element (2, 20), the density thereof, and also factors such as the environment temperature and humidity. This means that the cement mixture is made so as to comprise cement, water and additive in variable quantity so that the quantity of water used for each 100 kg of cement is variable in a range from 16.7 litres to 33.3 litres (where it is considered that one litre of water substantially weighs 1 kg) and the quantity of additive is variable in a range from 16.7 kg to 33.3 kg.

In a preferred embodiment of the present invention, the cement used to make the cement mixture 3 is sulfoaluminate cement. The cement used may also be selected between Portland cement, photocatalytic cement or other types provided with features that are suitable for the use provided by the invention. It is also possible to add pigments to the cement mixture so as to obtain a desired colouring thereof and to advantageously obtain a further decorative effect on the accessory cladding element obtained at the end of the process. Such pigments may consist of generic pigments and/or metallic oxides such as for example iron oxides, cobalt-based pigments, titanium dioxide-based pigments, chromium oxide-based pigments. According to such preferred embodiment, the concentration of such pigments may vary from 3% to 5% of the volume or between 1% and 2% by weight of the cement used.

The presence of a fluidifying additive allows increasing the workability of the cement mixture 3 and also the elasticity of the compound once hydrated in order to improve the resistance on brittle fractures. In a preferred embodiment, the additive consists of latex; further possible embodiments provide the use of super fluidifiers and/or set retarders and/or air-entrainment agents based on the specific needs.

The method provides applying at least one impermeable removable layer 9 on at least one portion of the first outer surface 4, thereby making a protective barrier that allows keeping the original features of the first outer surface 4 itself during the carrying out of the method for making the accessory cladding element. As specified, the applied layer 9 is removable, i.e. such whereby, once removed from the surface to which it was applied in an initial step of the method according to the present invention, it allows keeping substantially unaltered the surface to which it was applied, for example it allows leaving unaltered the surface features of texture, colouring, finishing, touch effects of the outer surfaces as they were present prior to the introduction of the fluid cement mixture.

In greater detail, the impermeable and removable layer 9 is applied at least on the decorative element on the outer surface 4. This means that the removable layer may be applied over the whole outer surface 4, or only on a part thereof. If for example, the outer surface has a decorative element only on one portion of the surface, in one embodiment the impermeable and removable layer 9 may be substantially applied only on this portion of surface, leaving instead uncovered other portions of the surface that are not decorated.

Once the impermeable and removable layer is applied on the decorative element of the outer surface 4, the cement mixture 3 is then introduced in the substantially fluid state into the support element (2, 20) so as to obtain a composite structure 1 that, in this step, is flexible and deformable.

Preferably, both the first outer surface 4 and the second outer surface 5 of the support element (2, 20) are permeable in order to allow the passage of the cement mixture 3 in the fluid state towards the inner volume of the support element. In this manner, it is possible to also only partially cover the first outer surface 4 with an impermeable and removable layer 9, allowing the introduction of the cement mixture 3 in the fluid state through both outer surfaces 4, 5, into the support element.

According to such shape of the support element, it is for example possible to soak the same by means of immersion bath, or a coating of the cement mixture 3 may be obtained on one or both outer surfaces of the support element 2.

In general, the support element (2, 20) is to have at least one opening through which the fluid cement mixture 3 may be introduced. Such opening may be provided on one of the outer surfaces of the support element in an area where there is no decorative element to be protected. Alternatively, such opening may be a side opening of the support element, i.e. provided on one of the four sides peripherally connecting the two outer surfaces 4 and 5; here, the two outer surfaces 4 and 5 may both be decorated and both protected by an impermeable and removable layer.

As shown in FIGS. 3b, 3g, 4b, 4h and 4o, in a preferred embodiment, the cement mixture 3 in the fluid state is put on the second outer surface 5 of the support element 2 and left to permeate through the same by gravity or with the contribution of a vibrating surface (not shown in the drawings) connected to the support element 2 or inserted in the support element by means of coating or spraying thereof or in any other manner.

Figure 3B:
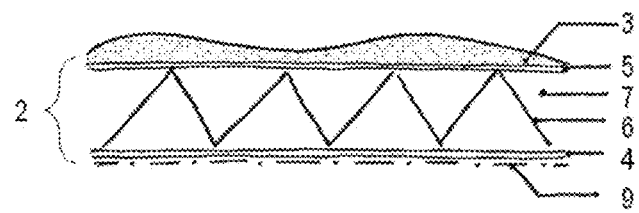
Figure 3C:
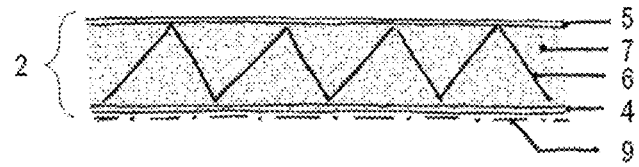
Figure 3D:
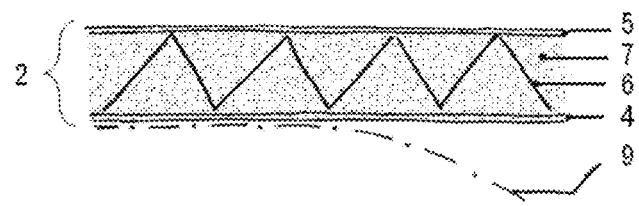
Figure 3E:
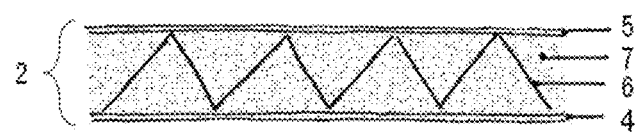
FIG. 3e schematically shows a sectional view of the cladding element obtained after the removal step of the impermeable and removable layer shown in FIG. 3d.
Figure 3F:
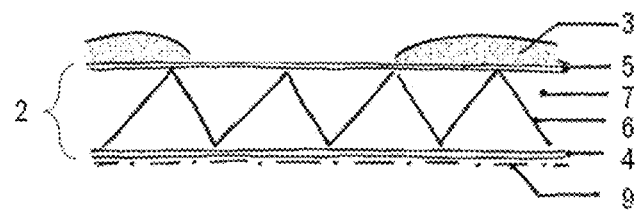
FIG. 3f schematically shows a sectional side view of a support element that is part of the composite structure, used for making a cladding element according to a second method of the present invention.
Figure 3G:
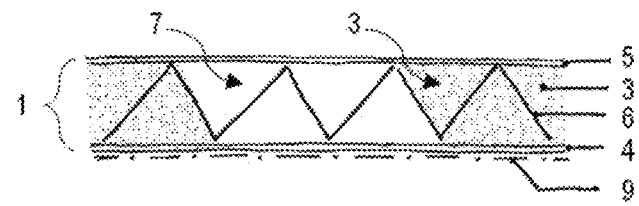
FIG. 3g schematically shows a pouring step of a fluid cement mixture onto selected portions of the support element of FIG. 3f.
Figure 3H:
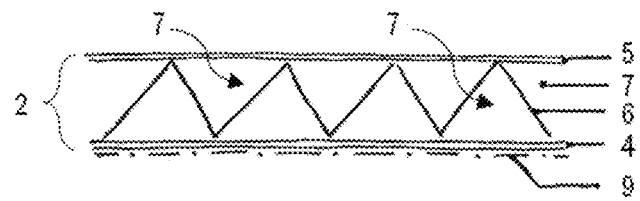
FIG. 3h schematically shows the cement mixture that has penetrated certain areas of the support element of FIG. 3f.
Figure 3I:
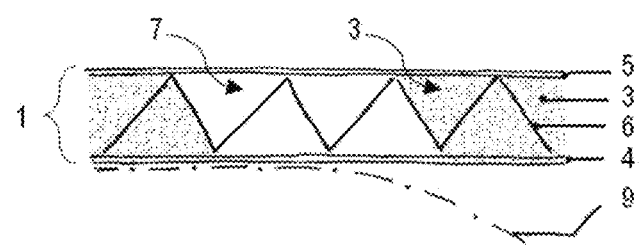
FIG. 3i schematically shows a removal step of an impermeable layer placed to protect an outer surface of the support element of FIG. 3f.
Figure 3L:
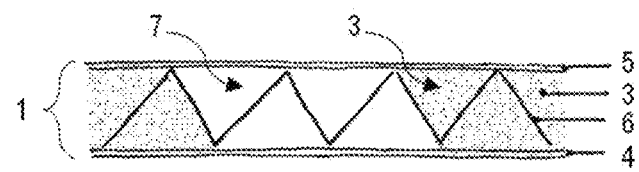
FIG. 3l schematically shows a sectional view of the cladding element obtained after the removal step of the impermeable and removable layer shown in FIG. 3i.

The cement mixture may be put over the whole outer surface 5, as shown in the examples in FIGS. 3b, 4b and 4h, or be put only on select portions of such surface, as shown in the examples in FIGS. 3g and 4o. By putting the cement mixture 3 only on select parts of the outer surface 5, certain inner volumes of the support element may be willingly left empty so as to allow the passage of light or air, as shown in FIGS. 5a, 5c, 5e and 5g.

In the case of multilayer support element 20, it is possible to provide for the cement mixture to cross all layers 11 of the support element, or only a part thereof.

In the example in FIG. 4c, for example the connecting layers 11 are connected by means of a connection element 12 that is an adhesive that has impermeability features so as to prevent the passage of the fluid cement mixture from the upper lever to the lower one. A similar result may be obtained by using, in addition or alternatively to an impermeable connection element 12, surfaces 40 and/or 50 with sufficiently tight wefts as to prevent the passage of the fluid cement mixture. For example, in one embodiment, the connection element 12 may be a simple thread used for tying together two support elements 2 of the type of FIG. 3a, one of which has a surface with weft and warp such as to prevent the passage of the fluid cement mixture 3. Again, in a further embodiment, the multilayer support element 20 may be made by means of hot sealing two outer surfaces of two single-layer support elements 2 made of polyethylene or other polymeric material. In this embodiment, the connection element 12 may be a powder or a film of the polymer material with which the two thermally-joined, single-layer support elements are made, or it may be an adhesive thermoplastic material.

In the examples of FIGS. 4i and 4p, the surfaces 40 and 50 and the connecting layer 12 instead are permeable to the fluid cement mixture 3, which may thus cross both connecting layers 11.

Following the introduction of the cement mixture 3 into the structure of the support element 2, according to one embodiment, there is a controlled and partial removal of the fluid cement mixture 3 from the support element so as to eliminate the possible excess fluid cement mixture. The action of removing part of the cement mixture may, for example be implemented by means of a controlled wringing of the deformable material being processed. Alternatively, it is possible to provide a suitably-shaped impermeable layer 9 to allow removing the cement mixture from certain areas of the support element by means of an air flow or a localized water jet.

In this manner, thanks also to the geometry of the inner structure of the support element that allows retaining the cement mixture 3 in the liquid state therein, the mixture is prevented from leaking in the successive processing steps. Furthermore, such method makes it possible to obtain—already in this processing step—a predetermined non-uniform distribution of the cement mixture 3 in the support element 2 so as to obtain areas having differentiated properties of transparency and/or translucency that alternated or not alternated with opaque areas. Furthermore, according to a preferred embodiment, in this step, cuts and/or openings are made in the fabric forming the support element; advantageously, the size of the cut may be absorbed by the elasticity of the fabric or amplified by the stress actions on the fabric itself.

The support element (2, 20) preferably has spacer elements 6 arranged so as to obtain a plurality of interconnected cavities 7. In this manner, the diffusion of the cement mixture 3 in the fluid state in the support element is promoted, thus allowing a homogeneous distribution thereof to be obtained in the cavities 7 and accordingly, a composite structure 1 with almost homogeneous mechanical features.

The composite structure 1 thus obtained is then introduced into a continuous or discontinuous forming device (not shown in the drawings) and configured to cause a desired final shape. In this regard, according to a predetermined shape in design step, the forming device may be moved so as to subject the composite structure 1, formed by the support element 2 joined to the cement mixture 3, to a localized or widespread mechanical stress action 13. In this manner, the composite structure may be stressed to be pulled and/or to compress according to one or more directions, up to obtaining the desired shape. Such movement of the forming device may be implemented manually or may be automated.

The final shape of the element, obtained downstream of such stresses, depends on a multiplicity of factors, such as: the position and the number of possible restraints (not shown in the drawings) placed along the perimeter of the composite structure 1, the number of points on which a stress is exerted, the shape of the devices adapted to the stressing, and the initial shape of the support element.

The above-mentioned stressing advantageously may also occur through localized compression or tensile action on the three-dimensional fabric forming the support element 2.

Furthermore, according to a preferred embodiment, in this step, cuts and/or openings are made in the fabric forming the support element; advantageously, the size of the cut may be absorbed by the elasticity of the fabric or amplified by the stress actions on the fabric itself.

Figure 8:
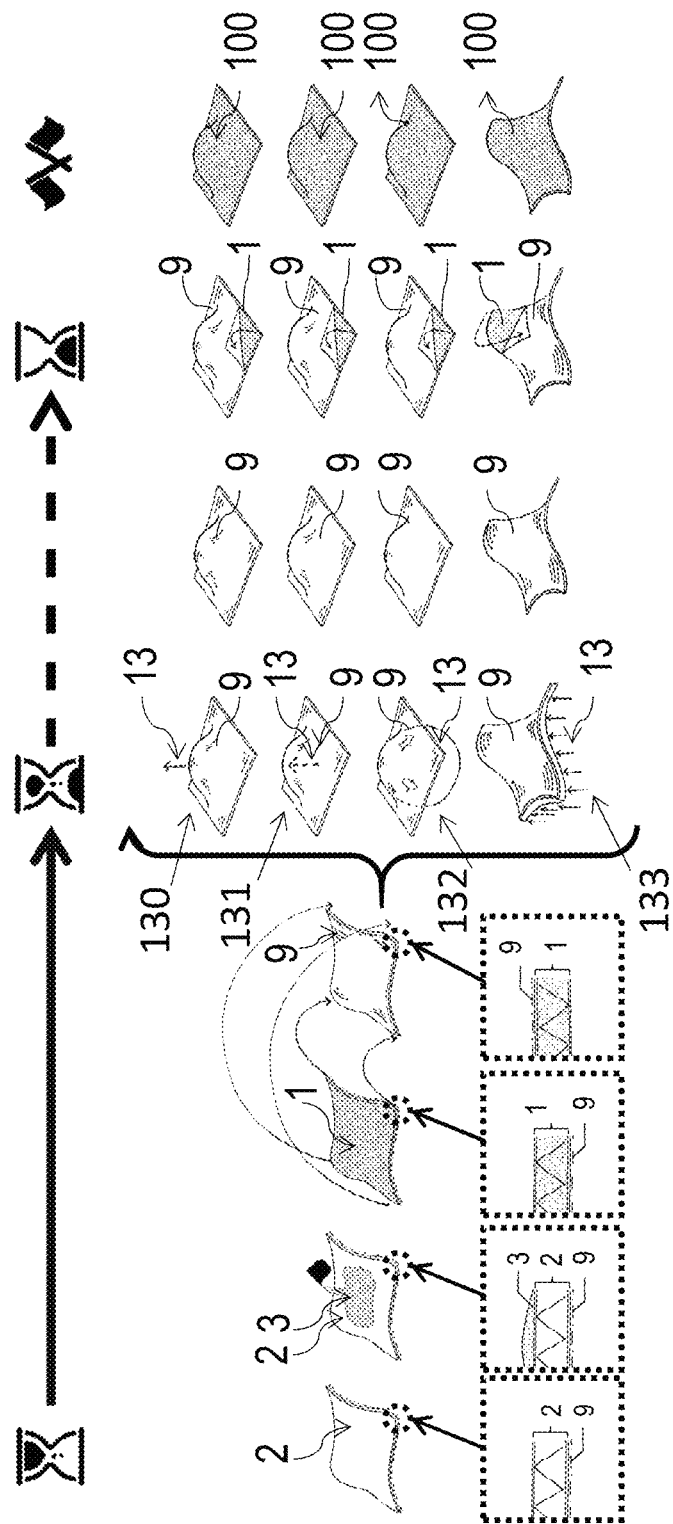
FIG. 8 schematically shows a method for making a multi-curved accessory cladding element.

FIG. 8 allows going over the steps hereto described. The hourglass at the top of the drawing indicates the passing of time and accordingly, the succession of the various steps. In this drawing, the support element 2 is provided with an impermeable and removable layer 9, after which the cement mixture 3 that penetrates the support element 2, is poured. After the cement mixture 3 is uniformly distributed over the support, for example by means of coating or wringing or spraying as described above, the composite structure in the example in FIG. 8 is overturned and rested on a forming device capable of exerting the necessary stresses 13 to deform the composite structure. FIG. 8 shows, by way of example, four different types of stresses which may be generated by the forming device, for example localized traction 130, localized pressure 131, deformation by gravity 132 due to the resting of the composite structure on a support, a stress 133 distributed along the outer surface opposite to the one provided with cladding element. Once the cement mixture 3 has solidified, the composite structure is removed from the forming device and the impermeable and removable layer is removed, thus obtaining the accessory cladding elements 100.

FIG. 9 shows a variant of the process of FIG. 8, wherein the composite structure 1 is not overturned prior to being subjected to stress by the forming device.

In a possible embodiment, such forming device consists of an adjustable frame that may be reusable or non-reusable. In a different embodiment, the forming device consists of a mould. In a further embodiment, the forming device is formed by an element with a resting and/or rigid restraining, suitably shaped and/or deformable perimeter.

The composite structure 1 is kept in association with the forming device up to the solidification of the cement mixture 3.

In a preferred embodiment, the composite structure 1 is removed from the forming device after solidifying, thus obtaining the desired accessory cladding element 100. Following the solidification of the composite structure, the impermeable and removable layer used to protect the decorative elements of the accessory cladding element 100, is removed.

In an alternative embodiment, in which the forming device consists of a frame, it is possible to keep the composite structure 1 in association with the frame itself. According to such method, it is possible to arrange cladding elements that have an additional reinforcing element that improves the mechanical resistance features thereof; the cladding elements thus obtained may further be coupled to other similar elements by means of the frame or parts thereof, to make complex structures.

According to a preferred embodiment, the composite structure 1 is kept in association with the forming device for a time interval Δt that is predetermined in design step according to the process variables and the geometry of the final cladding element 100 to be made.

Such time interval may be determined during the design step of the cladding element based on the specific size and geometrical features thereof.

Further parameters affecting the time required for the composite structure to harden and that are considered in the design step are, for example the environment temperature, the level of humidity, the solar radiation possibly incident on the surfaces, localized heat sources.

As mentioned above, in preferred embodiments of the invention, it is possible to define and create areas of the cladding element 100 that are partially lacking cement mixture 3 so as to obtain a permeability of the surface thereof to the passage of light and/or air and/or water, for a use of the cladding element 100, for example as light diffusion system and/or acoustic control system, climate-controlling element screening or masking, shading solar screening, or again in the employment in cladding systems of facades, partitions, architectural and interior design elements.

For example, the accessory cladding element 100 in FIG. 5a has features of transparency and/or translucency such as to allow the passage of light generated by a light source 200 placed behind the cladding element. The cladding element 4 in FIG. 5b has a surface capable of absorbing sound waves 400 that are reflected in a dampened manner. The accessory cladding element 100 in FIG. 5c has areas 101 without cement mixture 3, and therefore such as to allow the passage of air generated by a fan 300 placed behind the cladding element. The accessory cladding element 100 in FIG. 5f has an outer surface 4 such as to reflect the light generated by a light source 200 placed in front of the cladding element.

The accessory cladding element 100 in FIG. 5d comprises a sensor 102 that emits signals 103, embedded in the composite structure. According to different embodiments, the sensor may be of various type and be capable of receiving and/or transmitting signals via radio or via a wire that crosses or is embedded in the accessory cladding element.

Figure 6:
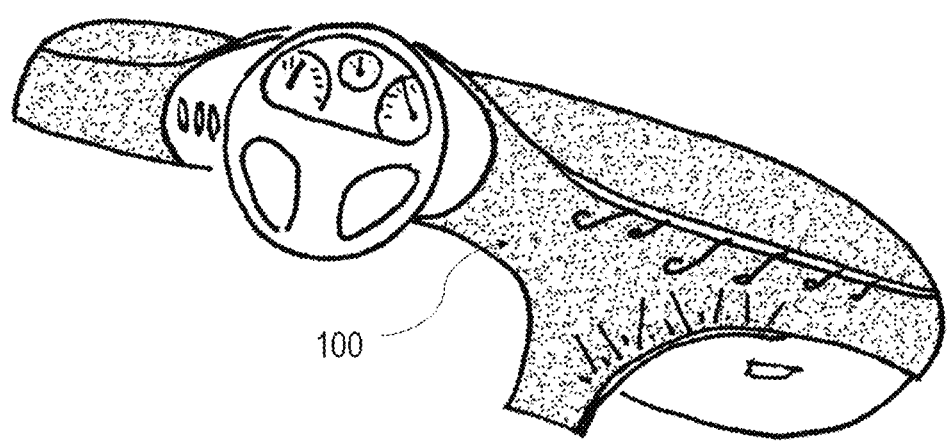
FIG. 6 is a schematic and perspective view of a further embodiment of the accessory cladding element according to the present invention.
Figure 7:
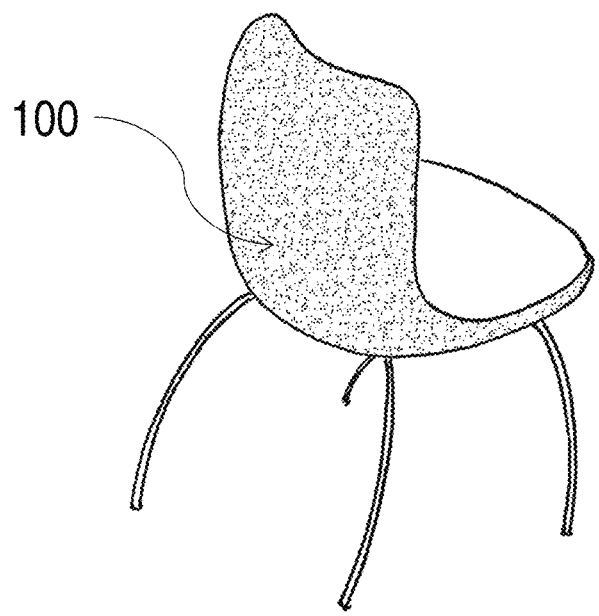
FIG. 7 is a perspective schematic view of a further embodiment of the accessory cladding element according to the present invention.

FIG. 6 shows an accessory cladding element 100 shaped to cover a dashboard of a car, while FIG. 7 shows a cladding element 100 for a chair.

As mentioned, the various effects of transparency and/or translucency may be achieved during the step of removing the cement mixture 3 in the fluid state from the support element (2, or 20) or during the step of introducing the cement mixture 3, by providing for pouring the material differentiated by areas. Furthermore, during the step of keeping the composite structure 3 in association with the forming device, it is possible to suitably move the latter so as to create non-homogeneity in the concentration of cement mixture in suitable areas identified beforehand in design step. Finally, it is possible to remove part of the cement mixture 3 in the liquid state in the support element 2 by means of localized operations, such as for example by leveling or removing material by means of a jet of fluid (for example, air or other gas or liquid) incident on the outer surfaces of the support element 2. Here, there is advantageously provided to only partially apply the removable layer 9 by assessing, beforehand in the design step, the portions of surface that are to be preserved (in particular, those provided with decorative element) so as to allow an easy flow of fluid in the portions kept free by the removable layer 9 itself.

By adjusting the quantity and the distribution of the cement mixture 3, it is possible to control the translucency and/or transparency of the cladding element 100; the translucency and/or transparency value may also be designed according to the geometry of the support element 2.

The method further provides removing the removable layer 9 previously applied on the first outer surface 4 once the cement-based composite structure has solidified. Such operation may be performed both while the cement-based composite structure is in association with the forming device and after the removal of the composite structure of the device itself.

In a further preferred embodiment, the method comprises creating an interruption of the continuity of the composite structure 1 by means of openings 8, during the association step with the forming device and before the solidification thereof is carried out. Such openings 8 may be made according to various geometries according to cuts and/or holes, in various possible sizes, while keeping the structural integrity of the cladding element 100. The resulting size of the holes or cuts may therefore be managed through a localized modification of the compression and tensile actions possibly applied to the fabric in shaping step. A localized increase of tensile actions along the surface of the previously cut fabric contributes to the separation of the cutting flaps thereof. A reduction of such localized tensile actions reduces the size thereof. Such operation may be implemented both prior to the introduction of the mixture and following it, and prior to the hardening step. Both actions contribute to modifying the final shape of the item. FIGS. 5e and 5g show two embodiments wherein the accessory cladding element 100 has cuts defining openings 8 such as to allow the passage of air and light generated respectively by a fan 300 and by a light source 200 placed behind the cladding element.

In a further preferred embodiment, the discontinuous drilling of the material may be obtained following the introduction step of the mixture into the three-dimensional fabric/support element and prior to the hardening step. In such step, a localized and discontinuous transparency may be, for example advantageously obtained by means of a jet of a fluid (for example, a flow of air or water) emitted by a nozzle so as to engrave one or more of the surfaces 4, 5 of the support element, which advantageously allows selectively removing a portion of cement mixture in the fluid state. Such an embodiment therefore allows a localized and select emptying of the interconnected cavities of the spacer element that were previously filled with cement fluid. Thus, the localized emptying is implemented at the space between weft and warp. Such removal, which does not occur on the totality of the surface of the support element, allows making semi-transparent portions with random, widespread or pre-determined patterns with pixelisation effect characterized by the geometry and by the feature of weft and warp.

In addition, at the end of the making process, the surface of the accessory cladding element 100 may be subjected to further surface treatments apt to improve the appearance thereof and/or to obtain specific surface features. Such treatments may for example, be operations involving colouring, leveling, smoothing, coating portions of the outer surfaces of the cladding element itself.

According to the method the object of the invention, it is possible to make accessory cladding elements 100 according to surfaces that are planar, have a single or double curve, up to complex surfaces with or without the presence of openings 8.

The accessory cladding elements 100 made according to the present invention are self-supporting but not structural. The thicknesses that may be obtained are greater than 1 mm and less than 30 mm. In a preferred embodiment, the thickness of the cladding element 100 has a variable value from 1 mm to 20 mm; even more preferably, from 3 mm to 14 mm.

The accessory cladding elements 100 according to the present invention may have multiple advantageous uses, such as for example, making architectural or design surfaces.

As mentioned, it is also possible to obtain cladding elements that have a point light source, for example by means of introducing light elements, and/or a diffused light source, for example by controlling the transparency of the cladding element in the making step and then preparing a light system positioned close to a non-visible portion of the cladding element itself and/or in the cladding element itself or behind the first outer surface 4 (such as for example, shown in FIGS. 5*a* and 5*g*) or at the front, so that the cladding element has the function of reflecting the light incident thereon (as for example, shown in FIG. 5*f*).

A further possible use is in making surfaces for an acoustic control: by making a particular shape of the first outer surface 4 in the making step and/or arranging a specific weft thereof, the acoustic properties of the accessory cladding element 100 may be modified.

The first outer surface 4 may also be used as climate-controlling surface, i.e. it is possible to control the permeability of the accessory cladding element 100 so as to couple it with ventilation systems placed behind it, thus obtaining an integrated climate-control system, as shown for example, in FIGS. 5*c* and 5*e*; alternatively, the accessory cladding element 100 may be placed in front of heating/cooling systems.

In a possible embodiment, it is also possible to position suitable sensors in the support element 2, as shown for example in FIG. 5*d*, or in the rear part thereof so as to allow the sensing of information and the possible subsequent implementation of an action; in this manner, it is possible to achieve a use of the accessory cladding element 100 as "sensing-actuating" surface.

The invention thus conceived is susceptible to several modifications and variations, all falling within the scope of protection defined by the appended claims.

For example, in the above-illustrated embodiments with reference to FIGS. 8 and 9, the accessory cladding element is formed in a forming device from which it is removed after the cement structure has solidified. This allows reusing the forming device to make other accessory cladding elements. However, in other embodiments, the forming device is a non-reusable element, for example an element that remains integrated in the accessory cladding element, for example a frame with the purpose of structurally integrating the panel.

Finally, all the details can be replaced with other technically-equivalent elements. Practically, any materials and also any contingent shapes and sizes may be used, depending on the specific implementation needs, without departing from the scope of protection of the following claims.

The invention claimed is:

1. A method for manufacturing an accessory cladding element for use in architecture, the method comprising:
   providing at least one elastically deformable support element comprising a first outer surface, a second outer surface and a plurality of spacer elements placed between said first and second outer surfaces;
   applying at least one impermeable and removable layer onto at least a portion of the first outer surface;
   preparing a substantially fluid, water-based cement mixture;
   introducing said substantially fluid cement mixture into the support element to which the at least one impermeable and removable layer was applied to obtain a cement-based composite structure in a deformable state;
   removing part of the substantially fluid cement mixture from the support element so as to eliminate excess cement mixture; —positioning said cement-based composite structure in the deformable state in a forming device;
   keeping said cement-based composite structure in association with the forming device up to solidification thereof; and
   removing said at least one impermeable and removable layer from said at least one portion of the first outer surface once the cement-based composite structure has solidified.

2. The method according to claim 1, wherein the first outer surface comprises a decorative element, and wherein said at least one impermeable and removable layer is applied on said decorative element.

3. The method according to claim 1, wherein the cement-based composite structure is removed from the forming device after the solidification of said composite structure.

4. The method according to claim 1, wherein said keeping the cement-based composite structure in association with the forming device comprises moving the forming device so as to obtain a predetermined configuration of the cement-based composite structure itself.

5. The method according to claim 1, wherein said at least one impermeable and removable layer comprises a deformable film made of plastic material or resin.

6. The method according to claim 1, further comprising forming at least one opening in the support element by cutting or drilling.

7. The method according to claim 1, wherein the at least one elastically deformable support element comprises at least two superimposed connecting layers,
   wherein the first outer surface of the at least one elastically deformable support element is a first free surface of one of the at least two superimposed connecting layers,
   wherein the second outer surface of the at least one elastically deformable support element is a second free surface of another of the at least two superimposed connecting layers, and
   wherein each of the superimposed connecting layers comprises a portion of the plurality of spacer elements placed between the first and second outer surfaces.

8. The method according to claim 1, wherein said cement mixture comprises at least one fluidifying and/or plasticizing additive.

9. The method according to claim 1, wherein the plurality of spacer elements are elongated and placed between the first and second outer surfaces so as to obtain a plurality of interconnected cavities.

10. The method according to claim 1, wherein at least one of said first outer surface and second outer surface is permeable.

11. The method according to claim 1, wherein the first outer surface comprises a decorative element, wherein said at least one impermeable and removable layer is applied on said decorative element, and wherein the cement-based composite structure is removed from the forming device after the solidification of said composite structure.

12. The method according to claim 11, wherein said keeping the cement-based composite structure in association with the forming device comprises moving the forming device so as to obtain a predetermined configuration of the cement-based composite structure itself.

13. The method according to claim 12, wherein said at least one impermeable and removable layer comprises a deformable film made of plastic material or resin.

14. The method according to claim 13, further comprising forming at least one opening in the support element by cutting or drilling.

15. The method according to claim 14, wherein the at least one elastically deformable support element comprises at least two superimposed connecting layers,
   wherein the first outer surface of the at least one elastically deformable support element is a first free surface of one of the at least two superimposed connecting layers,
   wherein the second outer surface of the at least one elastically deformable support element is a second free surface of another of the at least two superimposed connecting layers, and
   wherein each of the superimposed connecting layers comprises a portion of the plurality of spacer elements placed between the first and second outer surfaces.

16. The method according to claim 15, wherein said cement mixture comprises at least one fluidifying and/or plasticizing additive.

17. A method for manufacturing an accessory cladding element for use in architecture, the method comprising:
   providing at least one elastically deformable support element comprising a first outer surface, a second outer surface and a plurality of spacer elements placed between said first and second outer surfaces;
   applying at least one impermeable and removable layer onto at least a portion of the first outer surface;
   preparing a substantially fluid, water-based cement mixture, the cement mixture comprising at least cement, water and one fluidifying and/or plasticizing additive;
   introducing said substantially fluid cement mixture into the support element to which the at least one impermeable and removable layer was applied to obtain a cement-based composite structure in a deformable state;
   removing part of the substantially fluid cement mixture from the support element so as to eliminate excess cement mixture;
   positioning said cement-based composite structure in the deformable state in a forming device;
   keeping said cement-based composite structure in association with the forming device up to solidification thereof; and
   removing said at least one impermeable and removable layer from said at least one portion of the first outer surface once the cement-based composite structure has solidified.

18. The method according to claim 17, wherein the plurality of spacer elements are elongated and placed between the first and second outer surfaces so as to obtain a plurality of interconnected cavities.

19. The method according to claim 18, wherein at least one of said first outer surface and second outer surface is permeable.

* * * * *